Aug. 2, 1932. F. C. ROGERS ET AL 1,869,620
TIRE AND METHOD OF MAKING THE SAME
Filed Aug. 16, 1929
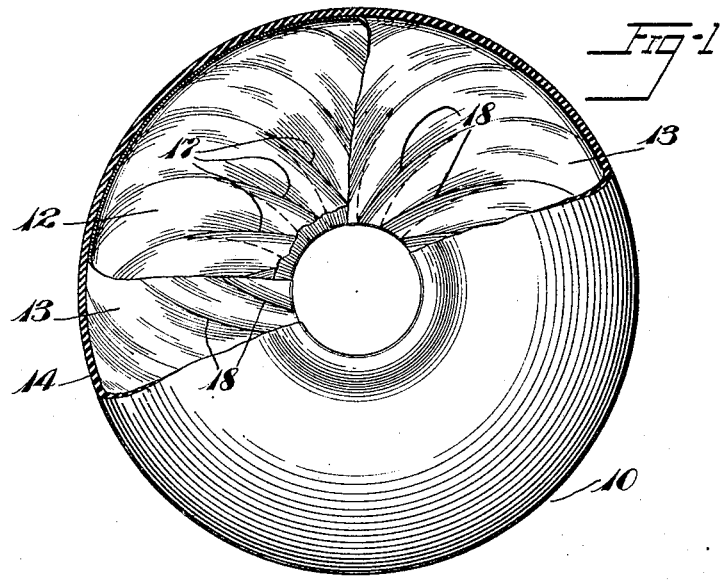
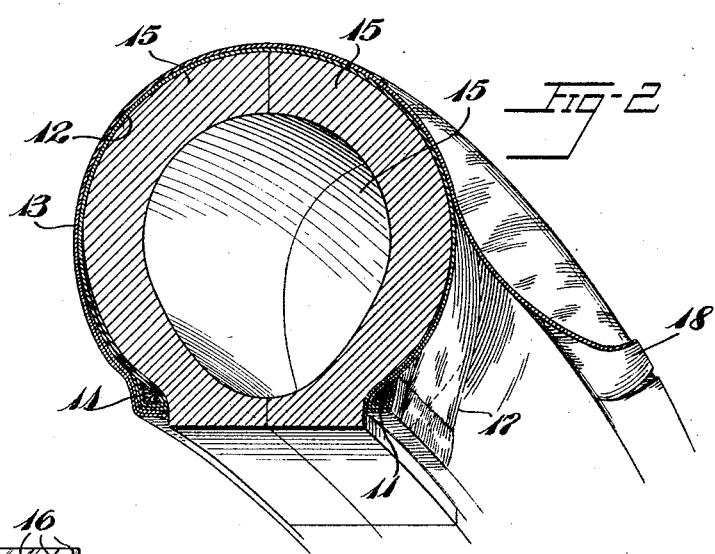
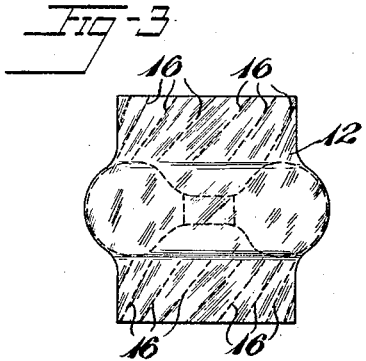
Inventors
Francis C. Rogers
Vincent B. Gay
By Eakin & Avery
Attys.

Patented Aug. 2, 1932

1,869,620

UNITED STATES PATENT OFFICE

FRANCIS C. ROGERS AND VINCENT B. GAY, OF AKRON, OHIO, ASSIGNORS TO THE B. F. GOODRICH COMPANY, OF NEW YORK, N. Y., A CORPORATION OF NEW YORK

TIRE AND METHOD OF MAKING THE SAME

Application filed August 16, 1929. Serial No. 386,345.

This invention relates to tires and methods of making the same, and more especially to the construction and manufacture of low pressure tires of large cross-section and small rim diameter such as are advantageously used on the landing gear and tail skids of aircraft.

The manufacture of tires of the character mentioned by the usual tire-building methods, presents numerous difficulties, among which is the difficulty of working the marginal portions of the bands of tire-building material about the relatively small bead portions of the tire, and it is to this problem that this invention is directed.

The chief objects of the invention are to provide an improved tire of the character mentioned; and to provide a method for economically and expeditiously making the same.

Of the accompanying drawing:

Fig. 1 is a side elevation of a tire constructed according to our invention in its preferred form, parts being broken away and a part being in section.

Fig. 2 is a sectional perspective view of a portion of the tire in the process of being built, and a tire-building form on which it is built.

Fig. 3 is an edge view of the tire, on a smaller scale, representing one stage of its manufacture.

Referring to the drawing, we show at 10 a tire comprising bead-rings 11, 11, an inner fabric ply 12, an outer fabric ply 13, and a relatively thin rubber cover 14 which is somewhat thicker at the tread portion of the tire. The fabric plies 12, 13 comprise rubberized weftless or weak-wefted cord fabric and are bias laid with the cords of one ply disposed at an angle to the cords of the other ply according to well-known tire construction. As is clearly shown in Fig. 2, our invention provides two plies of fabric under the beads 11 and four plies over the beads and extending therefrom onto the side walls of the tire, said four plies being integral parts of the two plies 12, 13.

In the manufacture of the tire, a frangible, collapsible, or knock-down building form or core may be used, the latter type being shown in Fig. 2 and comprising respective sections 15, 15 of such size and shape as to permit of their easy removal from the finished tire. With the assembled core mounted upon the usual rotatable spindle (not shown), the fabric ply 12 is mounted upon the core, said ply preferably being in the form of an endless band the diameter of which is substantially the same as the neutral diameter of the core, so that the band requires to be stretched over the core, whereupon it assumes substantially the shape shown in Fig. 3. The band may then be rolled down or stitched to the core from the crown to the neutral diameter of the core, after which the free lateral portions of the band are cut or slit, parallel to the cords, at spaced-apart points, from the respective edges of the said lateral portions substantially to the juncture of the latter with the core. The slits, which may conveniently be made by simply tearing the fabric, are indicated by broken lines 16, 16, Fig. 3, and the individual strips or tabs thus formed are designated 17, 17.

The tabs 17 on each side of the core are then applied to the core in succession in such a manner that each tab overlies the preceding tab about half its width at a point substantially at the inner periphery of the tire, and in turn is so overlaid by the next succeeding tab, as is most clearly shown in Fig. 1. Thus the single fabric band 12 presents a single thickness at the crown of the tire and a double thickness at the inner periphery thereof, which double thickness extends radially toward the neutral diameter of the tire in an annular series of gore-like or tapered patterns on each side of the tire. The tire-beads 11 are then mounted upon the opposite sides of the tire over the fabric ply 12 and the latter folded onto the inner periphery and outer face of each bead to provide a two-ply covering therefor as shown in Fig. 2.

Next the outer fabric ply 13 is mounted upon the tire core with its cords disposed at an angle to the cords of the ply 12, and is similarly slit in its lateral portions to provide tabs 18, 18 thereat. The tabs 18 are applied to the tire in the manner of the tabs 17, being overlaid upon each other to provide double thickness of the ply 13 over the outer face of the tire beads and on their inner peripheries to the toes of the beads. The cover ply 14 is then applied to the tire, after which the tire is vulcanized. Vulcanization may be effected while the tire remains on the building core, or the latter may be removed and an expansible core substituted.

The arrangement by which we obtain double ply thickness over the beads makes for strength at these points without increasing the weight of the tire, and the slitting of the fabric plies to form integral tabs permits the latter to be applied to the inner peripheral region of the tire easily and smoothly without such folding and buckling as would occur if the tire band were compressed and applied to the core by the use of stitcher rollers in the usual manner.

Our invention may be modified within the scope of the appended claims.

We claim:

1. A tire casing including a ply of reinforcing fabric which has its marginal portions formed with a plurality of integral tabs which extend to the inner periphery of the tire.

2. A tire casing as defined in claim 1 in which the tabs overlap each other at the inner periphery of the tire.

3. A tire casing including a ply of cord fabric which has its marginal portions formed with integral tabs, whose lateral margins are parallel to the fabric cords.

4. The method of making tires which comprises applying a strip of tire-building fabric circumferentially to a tire-building form at the crown thereof, providing the lateral portions of the strip with integral tabs, applying said tabs to the form, and then completing the building of the tire.

5. The method of making tires which comprises mounting an endless band of tire-building fabric upon a tire-building form at the crown thereof, slitting the lateral portions of the band to form integral tabs thereon, applying said tabs to the form, and then completing the building of the tire.

6. A method as defined in claim 5 in which the endless band comprises cord fabric and is slit parallel to the cords thereof.

7. The method of making tires which comprises applying a strip of tire-building fabric circumferentially to a tire-building form at the outer periphery thereof, forming integral marginal tabs on the lateral portions of said strip, applying said tabs to the form in overlapping relation to each other, and then completing the building of the tire.

8. A method as defined in claim 7 in which the tire-building fabric is cord fabric and the tabs are formed by slitting the same parallel to the cords thereof.

9. A tire casing, including a ply of parallel-laid angularly disposed cords, said ply having its central longitudinal portion progressively elongated to form it to toric shape and its marginal portions slitted between adjacent cords to provide radially extending tabs which are arranged in overlapping relation with the cords in successive tabs crossing each other to form thickened side wall and bead-enclosing portions of the tire.

10. The method of making tires which comprises forming a ply of parallel-laid angularly disposed cords, progressively elongating the central longitudinal portion thereof to form it to toric shape, slitting the margins between adjacent cords to provide radially extending tabs, and overlapping the tabs with the cords in successive tabs crossing each other to form thickened side wall and bead-enclosing portions of the tire.

In witness whereof we have hereunto set our hands this 7th day of August, 1929.

FRANCIS C. ROGERS.
VINCENT B. GAY.